United States Patent
Pham

[11] Patent Number: 5,832,278
[45] Date of Patent: Nov. 3, 1998

[54] CASCADED ROUND ROBIN REQUEST SELECTION METHOD AND APPARATUS

[75] Inventor: Thai H. Pham, Pflugerville, Tex.

[73] Assignee: Advanced Micro Devices, Inc., Sunnyvale, Calif.

[21] Appl. No.: 806,440

[22] Filed: Feb. 26, 1997

[51] Int. Cl.$^6$ .................................................. G06F 13/364
[52] U.S. Cl. ........................................... 395/731; 395/291
[58] Field of Search ..................................... 395/731, 291, 395/287, 728, 293, 729; 340/825.5

[56] References Cited

U.S. PATENT DOCUMENTS

| | | | |
|---|---|---|---|
| 4,924,380 | 5/1990 | McKinney et al. | 395/291 |
| 5,088,024 | 2/1992 | Vernon et al. | 395/291 |
| 5,280,591 | 1/1994 | Garcia et al. | 395/291 |
| 5,528,766 | 6/1996 | Ziegler et al. | 395/293 |
| 5,710,549 | 1/1998 | Horst et al. | 340/825.5 |
| 5,729,702 | 3/1998 | Creedon et al. | 395/291 |

*Primary Examiner*—Gopal C. Ray
*Attorney, Agent, or Firm*—Robert C. Kowert; Conley, Rose & Tayon; Kevin L. Daffer

[57] ABSTRACT

A two-level cascaded round robin arbiter. The arbiter arbitrates between a plurality of requesters for a shared resource in a round robin fashion. The arbiter comprises a series of first level arbiters which each receive a group of the plurality of requesters and select one requester in each group in a round robin manner. The first level arbiters operate in parallel to select their one requester thereby improving the overall selection time. The first level arbiters provide their selected requester to a second level arbiter which selects one group's selected requester to award use of the shared resource. The second level arbiter selects from among the groups in a round robin manner subject to an indication of a wrap condition provided by each of the first level arbiters to the second level arbiter. A wrap condition occurs when, in the process of selecting a requester, a first level arbiter has cycled from the previously selected requester through the fixed round robin order down to the lowest number requester and back up to the highest number requester. The second level arbiter continues to select the previously selected group as long as a wrap condition has not occurred in the previously selected group. Once a wrap condition has occurred, the second level arbiter selects the next group in the fixed cyclical order which has a currently active request. Each arbitration period the requester selected by the second level arbiter is latched and fed back to the first and second level arbiters which use the feedback history to select requesters according to the fixed cyclical round robin order.

20 Claims, 2 Drawing Sheets

CASCADED ROUND ROBIN REQUEST SELECTION METHOD AND APPARATUS

BACKGROUND OF THE INVENTION

1. Field of the Invention

This invention relates to the field of circuitry for selecting one of a plurality of requests in a prioritized manner, and more particularly to methods of performing round robin selection of requests.

2. Description of the Relevant Art

Electronic circuits commonly require logic for selecting one requester from a plurality of requesters which are requesting use of a shared resource. For example, a communications system may comprise a plurality of direct memory access (DMA) channels each requesting use of a shared data bus in order to transfer data from a source location to a destination location. In such a system, logic is required to function as an arbiter for the shared resource, i.e., the data bus, to grant only one of the DMA channels ownership of the data bus at a time.

The arbiter, by its very nature, incorporates a priority scheme for selecting among the various DMA channels. That is, the arbiter associates a priority with each of the DMA channels. The priority scheme may individually assign priorities based on some prior knowledge. For example, the priority scheme may be such that each DMA channel has an associated channel number, and the higher the channel number the higher the priority of the channel. In such a scheme, the channel with highest channel number requesting the bus, will be granted the bus by the arbiter at the next available arbitration period.

Another common priority scheme is to assign each of the requesters an equal priority. In such as case, requesters are chosen in turn. Such a scheme is commonly referred to as a "round robin " scheme. A round robin scheme of selecting or arbitrating among a set of requesters may be defined as a scheme which selects one of a plurality of requesters in a fixed cyclical order. By way of example, the operation of a round robin arbiter shown in FIG. 1 is described below.

FIG. 1 illustrates a 12-input round robin arbiter 12 which may be used in such an application as the communications system described above to arbitrate between 12 DMA channels requesting use of a data bus to transfer data. Each of the 12 DMA channels is assigned a number, 0 through 11, and may request use of the bus via its corresponding request signal, current_req, corresponding to its channel number. The 12-input round robin arbiter receives the current_req [11:0] signals 16, selects one of the 12 request signals, and asserts the selected_req signal corresponding to the channel number selected. The selected_req[11:0] signals 18 are latched by latch 14 and fed back as prev_selected[11:0] signals 20 as inputs to the 12-input round robin arbiter 12. The prev_selected[11:0] signals provide a history of the request previously selected by the arbiter 12 which enables the arbiter 12 to determine which of the requests to select next according to the fixed cyclical order of the requests.

Appendix A includes Verilog source code to describe an implementation of the arbiter 12 of FIG. 1. In the arbiter 12, select_req[11:0] correspond to requesters 11 through 0 respectively. The arbiter 12 selects requesters in a fixed cyclical order from 11 through 0. Thus, if in a given arbitration period requesters 8, 4, and 3 are all requesting, i.e., if signals current_req[8], current_req[4], and current_req[3] are all asserted, then the arbiter 12 will determine which requester was previously selected. If requester 2, 1, 0, 11, 10, or 9 was the previously selected requester, then the arbiter 12 will select requester 8, as can be ascertained from Appendix A. If requesters 8, 7, 6, or 5 was the previously selected requester, then the arbiter 12 will select requester 4. If requester 4 was the previously selected requester, then the arbiter 12 will select requester 3. Thus, the arbiter 12 always determines the previously selected requester and selects the currently requesting requester which is next lowest in the fixed order of requesters, taking into account the cycling, or "wrapping", around of the fixed order. That is, once the arbiter 12 reaches requester 0, the arbiter 12 "wraps " back up to requester 11 to determine the next currently requesting requester. Thus, essentially requester 11 is "next lowest " in the fixed cyclic order after requester 0.

While the round robin priority scheme provides fairness among requesters, a property of the round robin scheme is that the time required to select a requester increases with the number of requesters requesting use of the resource being arbitrated for. That is, according to conventional methods, the number of maximum possible decodes to compare the current requesters with the previously selected requester which must be performed by a round robin arbiter increases essentially linearly with the number of requesters which are being arbitrated between. Therefore, in situations where the number of requesters is relatively high, the round robin scheme may prove prohibitive to use.

For example, consider again the arbiter 12 described above. Appendix B includes a timing report indicating the data arrival time, i.e., the worst case propagation delay for the arbiter 12 described in Appendix A to select one of the 12 requesters, in this case to select requester 4. The worst case time for at least one implementation using current technology is approximately 19.76 nanoseconds. Considering a communications system employing the arbiter 12, for example, in which the communications protocols being used require relatively high clock rates, such as 50 MHz (i.e., with 20 nanosecond cycle times), then it may be readily observed that the arbiter 12 may require essentially the entire clock cycle time to select a requester. This fact essentially renders the use of the round robin arbiter unusable, even though the application requires a round robin arbitration scheme. Therefore, an improved round robin arbitration method and apparatus is desired.

SUMMARY OF THE INVENTION

The problems outlined above are in large part solved by a cascaded round robin arbitration method and apparatus of the present invention. In one embodiment, a two-level cascaded arbitration mechanism receives a plurality of requester inputs and selects one of the requesters for each arbitration period to award use of a shared resource, such as a data bus, or service by a processor. The arbiter comprises a series of first level arbiters coupled in parallel, the output of which is forwarded to a second level arbiter. The requesters are grouped, and each group of requesters is provided to a corresponding first level arbiter. An exemplary embodiment is described in which a 12 requester arbiter comprises three first level arbiters which each receive a group of four requesters, and a second level arbiter selects from among the three groups. It is understood, however, that more or less than 12 requesters may be serviced by the present scheme. If the number of first level arbiters is three, then the total number of requesters being serviced are grouped approximately equally among the three first level arbiters. However, the number of first level arbiters can be more or less than three depending on the desired application.

The first level arbiters operate in parallel to select one of the currently active requesters in their group. The requester selected from each group, i.e., by each first level arbiter, is provided to the second level arbiter. The second level arbiter selects the selected requester from one of the groups as the final selected requester, i.e., the winner of the arbitration. That is, the second level arbiter in cooperation with the first level arbiters selects which of the plurality of requesters to award use of the shared resource.

The requester selected by the second level arbiter is latched at the end of the arbitration period. The latched selected requester is provided as feedback to the first and second level arbiters. Each of the first level arbiters selects from among the requesters in their group in a round robin fashion using the fed back previous selected requester indication as history. In particular, if the requester previously selected by the second level arbiter is in the group belonging to the first level arbiter, the first level arbiter selects the next currently active requester in the fixed cyclical order. Otherwise, the first level arbiter selects the currently active requester with the highest requester number.

Each of the first level arbiters determines whether or not a wrap condition has occurred during the time in which one of the requesters in its group is being selected. A wrap condition occurs when, in the process of selecting a requester, a first level arbiter has cycled from the previously selected requester through the fixed round robin order to down to the lowest number requester and back up to the highest number requester. Each first level arbiter provides an indication of a wrap condition to the second level arbiter.

The second level arbiter selects from among the groups in a round robin fashion using the fed back previous selected requester indication as history and additionally in response to the wrap indication from each first level arbiter. In particular, the second level arbiter continues to select a requester from the same group previously selected until a wrap condition has been indicated by the first level arbiter of that same group. When a wrap condition has been indicated, the second level arbiter selects the next group in the fixed cyclical order, i.e., in a round robin fashion, which has an active requester.

Since a substantial number of the comparisons required are performed in parallel by the series of first level arbiters, the overall worst case arbitration time required by the arbitration mechanism of the present invention is less than the worst case time of conventional methods. Furthermore, the amount of logic, and therefore circuit area, required to embody an arbiter according to the present invention is less than that of conventional arbiters. Thus, the first and second level arbiters cooperate to perform round robin arbitration among a plurality of requesters in an improved, more time-expedient manner.

Broadly speaking, the present invention contemplates an arbiter comprising a series of first level arbiters connected in parallel, wherein each first level arbiter is configured to select a request signal from among a group of request signals forwarded thereto. The arbiter further comprises a second level arbiter configured to receive and discern which request signal forwarded from the first level arbiters to select. The second level arbiter is configured to select another request signal forwarded from the same first level arbiter which forwarded the previous selected request signal before selecting a request signal forwarded from a first level arbiter different from the first level arbiter which forwarded the previous selected request signal.

The present invention further contemplates a method for selecting one of a plurality of requests, comprising receiving a plurality of groups of requests and selecting, in parallel, an intermediate request from each of the plurality of groups. The method further comprises selecting a request from among the intermediate requests wherein the request is selected from the same group from which the previous request was selected before a request is selected from a different group from which the previous request was selected.

BRIEF DESCRIPTION OF THE DRAWINGS

Other objects and advantages of the invention will become apparent upon reading the following detailed description and upon reference to the accompanying drawings in which.

Figure 1:
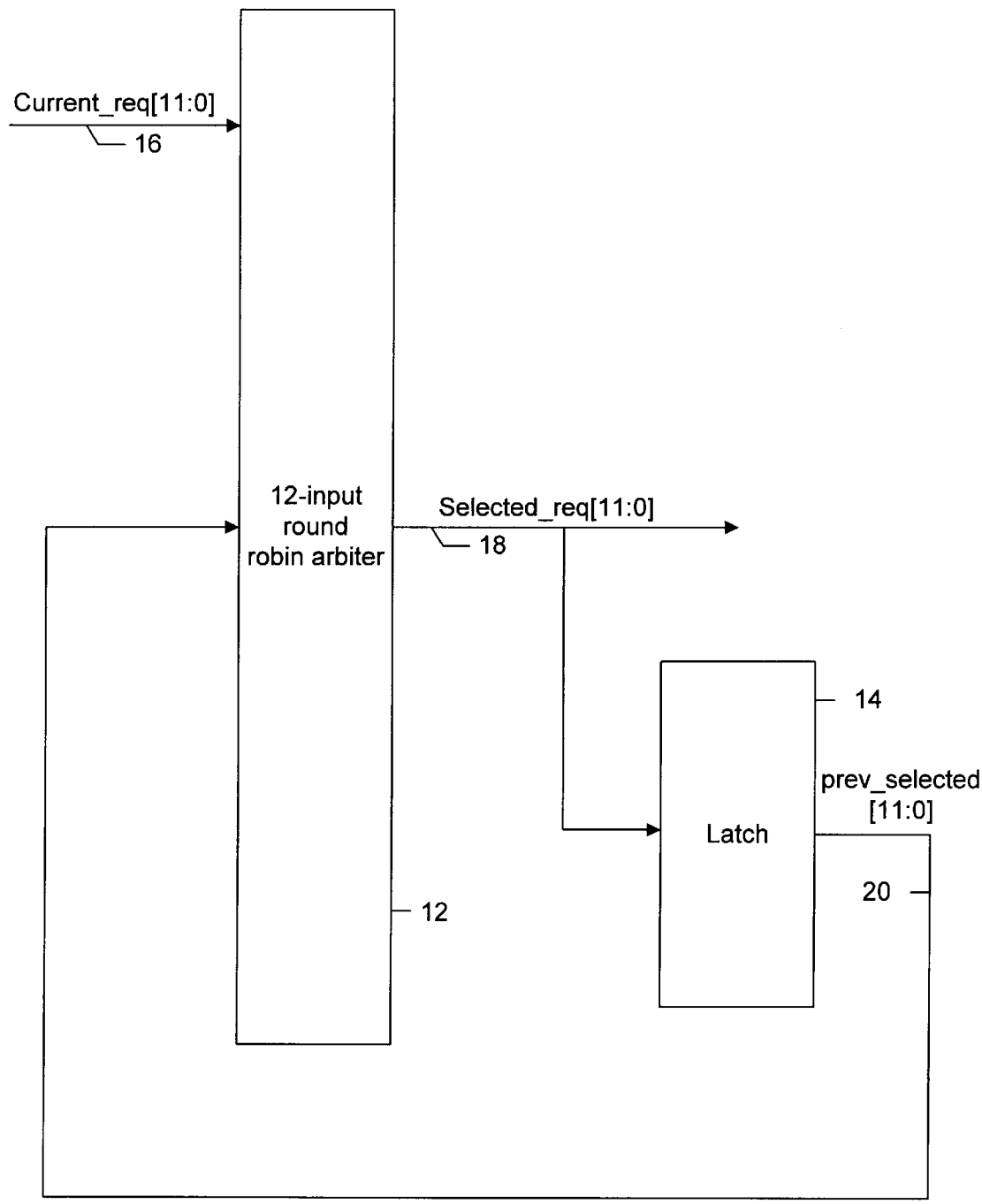
FIG. 1 is a block diagram illustrating a conventional round robin arbiter.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF PREFERRED EMBODIMENTS

Figure 2:
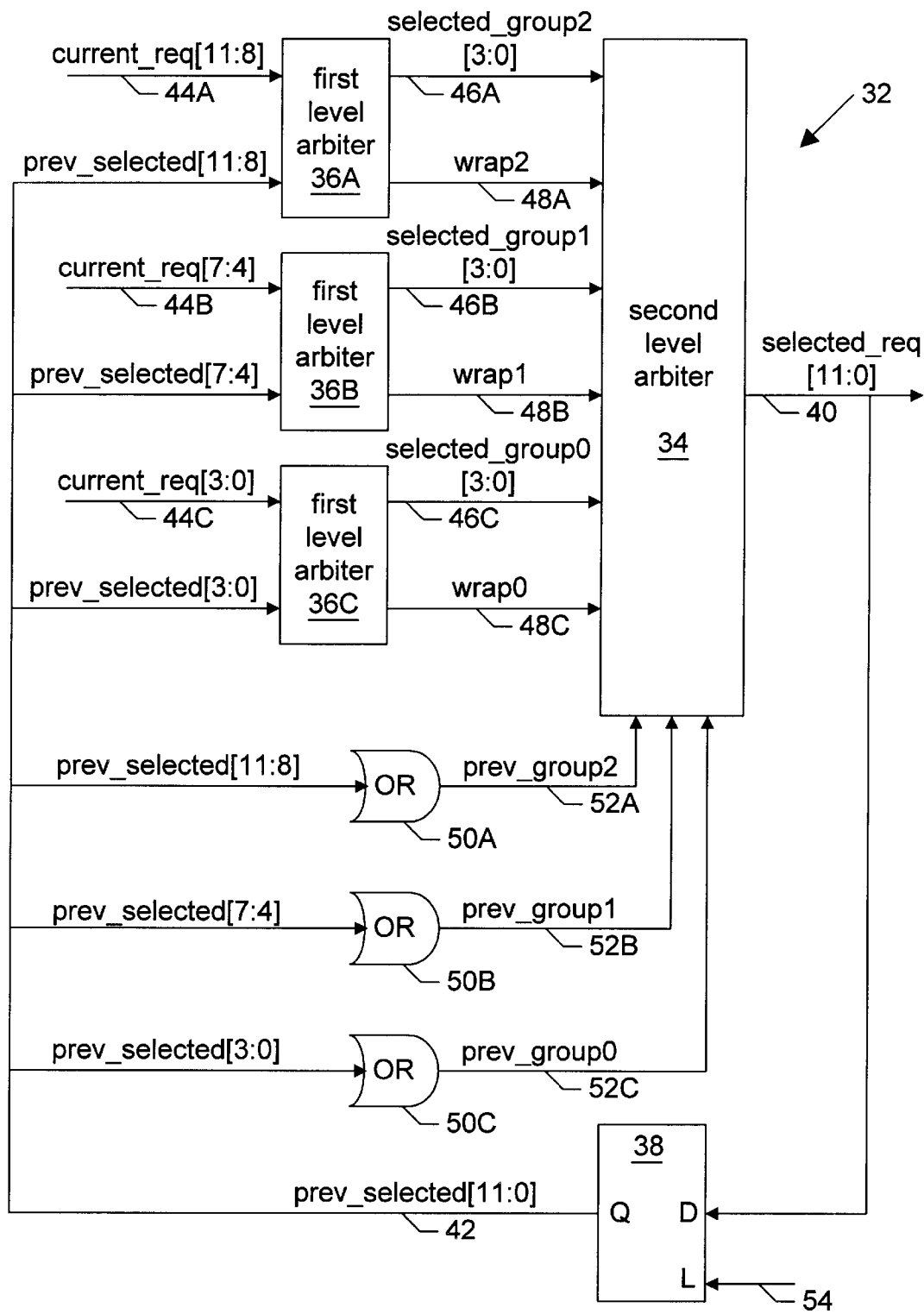
FIG. 2 is a block diagram of a 2-level cascaded arbiter according to a preferred embodiment of the present invention.

Turning now to FIG. 2, a block diagram of a 2-level cascaded arbiter 32 according to a preferred embodiment of the present invention is shown. The arbiter 32 is an arbiter configured to select one request signal from among a plurality of request signals. Arbiter 32 selects one of twelve request signals and is intended to be a representative implementation of the present invention. Thus, it may be readily observed that the present invention is not limited in the number of requests which may be selected from, but rather the present invention may be expanded to accommodate any number of requests to be selected from.

Arbiter 32 comprises three first level arbiters 36A–36C (referred to collectively as 36) coupled in parallel to a second level arbiter 34. Preferably, first level arbiters 36 and second level arbiter 34 comprise combinatorial digital logic. The first level arbiters 36 each select one request signal from among a group of request signals and forward the selected request signal to the second level arbiter 34 which selects one group from among the groups as the final selected request signal. The 2-level, or "cascaded", architecture of arbiter 32 advantageously provides improved performance over conventional single level arbiters and further advantageously may be implemented with fewer logic gates than conventional single level arbiter implementations, as will be discussed below.

First level arbiters 36A, 36B and 36C each receive a group of four request signals: current_req[11:8] signals 44A, current_req[7:4] signals 44B, and current_req[3:0] signals 44C, respectively, referred to collectively as current_req[11:0] signals 44. The current_req signals 44 are the request signals being generated by the requesters requesting use of a shared resource. Each of current_req signals 44 correspond to a different requester according to the signal index. That is, requester 3 asserts the current_ req[3] signal to request use of the shared resource being arbitrated for by the arbiter 32, for example. In one application, current_req signals 44 may be generated by 12 DMA channels requesting use of a shared data bus in a round robin fashion, for example. In another application, the current_req signals 44 may be 12 interrupt request signals requesting service from a processor in a round robin fashion.

Any or all of the current_req signals 44 may be active, i.e., asserted, at any time. When one of the current_req signals 44 is active it is said to be "requesting." During each arbitration period the arbiter 32 selects one of the currently requesting current_req signals 44 to award ownership of the shared resource. The arbitration period is determined by a latch signal 54 which causes latch 38 to latch selected_req [11:0] signals 40 which indicate which requester was selected by the arbiter 32. For example, a data bus may be shared among a set of DMA channels according to time slices. That is, a first DMA channel may be granted ownership of the data bus for a first period of time and perform data transfers on the data bus, then a second DMA channel may be granted ownership of the data bus for a second period of time and perform data transfers on the data bus. If the first DMA channel did not complete its data transfer during the first period of time, it may continue to request the data bus and be granted the data bus during a third period of time and transfer more data. In this example the arbitration period is determined according to a fixed amount of time.

In another example, the latch signal 54 may be configured such that each DMA channel is allowed to complete its entire data transfer on the data bus before another DMA channel is awarded ownership of the data bus. In this example, the arbitration period varies according to the time required for a given DMA channel to complete a given DMA transfer. In another example, the arbitration period may correspond to a bus clock or system clock, such as a 50 MHz clock signal. Thus, it may be readily appreciated that the arbiter 32 advantageously arbitrates between a plurality of requesters in a flexible manner to accommodate the arbitration period requirements of the particular application in which the arbiter 32 is employed.

First level arbiters 36A–36C also receive prev_selected [11:8] signals, prev_selected[7:4] signals, and prev_selected[3:0] signals, respectively, referred to collectively as prev_selected[11:0] signals 42. The prev_selected signals 42 indicate which one of the current_req signals 44 was selected by the arbiter 32 during the previous arbitration period. The prev_selected signals 42 correspond to the current_req signals 44 latched across the arbitration period, e.g., the prev_selected[5] signal corresponds to the current_req[5] signal in that they both correspond to requester 5. The prev_selected signals 42 are generated by latch 38 latching selected_req[11:0] signals 40, also referred to as selected_req signals 40.

The selected_req signals 40 correspond to the current_req signals 44, e.g., the selected_req[5] signal corresponds to the current_req[5] signal. The selected_req signals 40 are generated by second level arbiter 34 and indicate which of the currently requesting current_req signals 44 is to be granted use of the shared resource. Since only one of the current_req signals 44 is selected by the arbiter 32 during a given arbitration period, only one of the selected_req signals 40 is active. Consequently, only one of the prev_selected signals 42 is active. If none of the current_req signals 44 are active, none of the selected_req signals 40 will be active.

The prev_selected signals 42 are fed back as inputs to the first level arbiters 36 and second level arbiter 34 to provide history of the selection performed by the arbiter 32 during the previous arbitration period prior to the "next " current_req signal. This history enables the first level arbiters 36 and second level arbiter 34 to work in a cooperative manner to select from among the current_req signals 44 in a round robin, or fixed cyclical order.

By convention, the four current_req signals 44 selected by first level arbiter 36A are referred to as group 2, the four current_req signals 44 selected by first level arbiter 36B are referred to as group 1, and the four current_req signals 44 selected by first level arbiter 36C are referred to as group 0. First level arbiter 36A selects one of the current_req signals 44 in group 2 and indicates its selected requester on selected_group2[3:0] signals 46A. First level arbiter 36B selects one of the current_req signals 44 in group 1 and indicates its selected requester on selected_group1[3:0] signals 46B. First level arbiter 36C selects one of the current_req signals 44 in group 0 and indicates its selected requester on selected_group0[3:0] signals 46C. Selected_group0[3:0] signals 46C, selected_group1[3:0] signals 46B, and selected_group2[3:0] signals 46A are referred to collectively as selected_group signals 46.

Each of the first level arbiters 36 determines which of its four current_req signals 44 is active and selects one of them in a round robin manner. Thus, only one of the selected_group signals 46 from each of the three groups is active at any given time. In one embodiment, the fixed cyclical order of the round robin scheme is from highest to lowest requester number and then cycling back, i.e., "wrapping " from the lowest requester number up to the highest requester number to repeat the fixed highest-to-lowest arbitration. For example, if current_req signal[10] and current_req signal [8] are active, and prev_selected signal[9] is active (indicating that requester 9 was chosen in the previous arbitration period), then first level arbiter 36A will assert selected_group2[0] to indicate that requester 8 is selected. In other words, current_req[11:8] signals 44A correspond to selected_group2[3:0] signals 46A, current_req[7:4] signals 44B correspond to selected_group1[3:0] signals 46B, and current_req[3:0] signals 44C correspond to selected_group0[3:0] signals 46C. It may be readily observed that a different convention or the fixed cyclical order may be chosen, such as from lowest to highest and wrapping back to lowest, if desired.

Each of the first level arbiters 36 also asserts a corresponding wrap signal (i.e., wrap2 signal 48A, wrap1 signal 48B, and wrap0 signal 48C, referred to collectively as wrap signals 48) to indicate a wrap condition. A wrap condition occurs when, in the process of selecting a requester, a first level arbiter 36 has cycled from the previously selected requester through the fixed cyclical order down to the lowest number requester and back up to the highest number requester. In the example of the previous paragraph, the first level arbiter 36A would not assert the wrap2 signal 48A since it did not need to wrap in order to select requester 8. However, assume that the previous requester had been requester 8. In this example, the first level arbiter 36A would have selected requester 10, thereby causing a wrap condition to occur. Thus, the first level arbiter 36A would have asserted the wrap2 signal 48A. An active wrap signal indicates to the second level arbiter 34 that the corresponding group will have lower priority than the other groups in being selected by the second level arbiter 34, as will be discussed.

The second level arbiter 34 receives the selected_group signals 46 and selects one of the asserted selected_group signals 46 to award ownership of the shared resource. The second level arbiter 34 asserts one of the selected_req signals 40 associated with the selected one of the selected_group signals 46. The second level arbiter 34 selects one of the selected_group signals 46 in a round robin manner using feedback history regarding the previously selected requester as indicated by the prev_selected signals 42. The second level arbiter 34 also receives the wrap signals 48 and uses the wrap signals 48 to determine which group of requesters to select next.

Prev_group2 signal 52A, prev_group1 signal 52B, and prev_group0 signal 52C (referred to collectively as prev_group signals 52) are generated by four-input OR gates 50A, 50B, and 50C (referred to collectively as OR gates 50), respectively, which receive prev_selected[11:8] signals, prev_selected[7:4], and prev_selected[3:0] signals, respectively. Preferably, OR gates 50 are implemented as part of second level arbiter 34. The second level arbiter 34 employs the selection history provided by the prev_group signals 52 to select from among the requester groups in a round robin manner, as modified by the wrap signals 48.

The second level arbiter 34 selects from among the three groups as follows. If the previously selected group still has a requester currently requesting use of the shared resource, i.e., if one of the selected_group signals 46 in the previously selected group is asserted, then as long as the wrap signal of that group is not asserted, the second level arbiter 34 will select that group, i.e., the active one of the selected_group signals 46 from the previously selected group. However, if the wrap signal of the previously selected group is active, then the second level arbiter 34 will attribute a lower priority to that group, i.e., the previously selected group, and choose the next group in the fixed cyclical order. Thus, if the wrap signal of the previously selected group is active, the second level arbiter 34 will only select the previously selected group if no other groups currently have an active request.

Operation of the arbiter 32 will be described subsequently by way of example with reference to Table 1.

In the example illustrated in Table 1, the currently requesting requesters, denoted by current_req, are chosen to illustrate the operation of the arbiter 32. In table 1, an "N" indicates "None", i.e., no active signals for the indicated signal group. The prev_selected column corresponds to prev_selected signals 42, the current_req column corresponds to current_req signals 44, the selected_group 2,1,0 column corresponds to selected_group2 signals 46A, selected_group1 signals 46B, and selected_group0 signals 46C, respectively. The wrap 2,1,0 column corresponds to wrap2 signal 48A, wrap1 signal 48B, and wrap0 signal 48C, respectively. The prev_group column indicates which of prev_group2 signal 52A, prev_group1 signal 52B, and prev_group0 signal 52C is active. The selected_req column corresponds to selected_req signals 40. The wrap signals are denoted as binary values. All other values are described as decimal values corresponding to the associated requester for simplicity, rather than describing the value of each binary signal.

Let us assume that arbitration period 1 describes a set of initial conditions, namely that the previously selected requester was requester 10. Thus, prev_selected signals [11:0] 42 would have a hexadecimal value of 0x400. Let us assume requesters 8, 5, and 4 are requesting use of the shared resource during arbitration period 1, i.e., current_req[11:0] signals 44 have a hexadecimal value of 0x130.

In response to these inputs, group 2 first level arbiter 36A selects requester 8 since it is the only requesting requester in group 2, i.e., first level arbiter 36A generates selected_group2[3:0] signals 46A with a hexadecimal value of 0x1; group 1 first level arbiter 36B selects requester 5 since requester 5 has a higher requester number than requester 4 (i.e., has the highest current requester number in group 1) and the previously selected requester is not from group 1, i.e., first level arbiter 36B generates selected_group1[3:0] signals 46B with a hexadecimal value of 0x2; group 0 first level arbiter 36C selects no requester since no requesters in group 0 are currently active, i.e., first level arbiter 36C generates selected group0[3:0] signals 46C with a hexadecimal value of 0x0.

Group 2 first level arbiter 36A does not assert its wrap signal since it did not have to wrap in order to select requester 8. Group 1 and 0 first level arbiters 36B and 36C do not assert their wrap signals since their group was not the previously selected group and therefore cannot generate a wrap condition. Since the previously selected requester, 10, is in group 2, the prev_group value indicates group 2. Finally, the second level arbiter 34 selects group 2, i.e., requester 8, since the previously selected group was group 2 and the group 2 wrap signal is not asserted. That is, the second level arbiter 34 generates selected_req[11:0] signals 40 with a hexadecimal value of 0x100.

In arbitration period 2, the previously selected requester is now 8. Let us assume requesters 5 and 4 are active. Since requesters 5 and 4 are both in group 1, no requesters are selected in groups 2 and 0. Group 1 first level arbiter 36B selects requester 5 since requester 5 has the highest current requester number in group 1 and the previously selected requester is not from group 1. The group 2 wrap signal is active since the group 2 arbiter 36A had to wrap from requester 8 up to requester 11 and down through requesters 10, 9 and 8 to look for an active requester, even though it found none. The previous group is 2 since requester 8 is in group 2. The second level arbiter 34 selects group 1, i.e., requester 5, since group 1 is the only group with an active requester.

In arbitration period 3, the previously selected requester is now 5. Let us assume requesters 9, 6 and 4 are active. Since requester 9 is the only requester in group 2, it is selected. Since no requesters are active in group 0, none are selected.

TABLE 1

| arb period | prev selected | current_req | selected_group2, 1, 0 | wrap 2, 1, 0 | prev_group | selected_req |
|---|---|---|---|---|---|---|
| 1 | 10 | 8, 5, 4 | 8, 5, N | 0, 0, 0 | 2 | 8 |
| 2 | 8 | 5, 4 | N, 5, N | 1, 0, 0 | 2 | 5 |
| 3 | 5 | 9, 6, 4 | 9, 4, N | 0, 0, 0 | 1 | 4 |
| 4 | 4 | 9, 6 | 9, 6, N | 0, 1, 0 | 1 | 9 |
| 5 | 9 | 6, 2 | N, 6, 2 | 1, 0, 0 | 2 | 6 |
| 6 | 6 | 2 | N, N, 2 | 0, 1, 0 | 1 | 2 |
| 7 | 2 | N | N, N, N | 0, 0, 1 | 0 | N |

In group 1, requester 4 is selected since it is next in the fixed cyclical order from the previous requester 5, even though requester 6 has a higher requester number. The group 1 wrap signal is not asserted since a wrap condition did not occur in choosing requester 4 for group 1. Since the previously selected requester 5 is in group 1, the previous group is group 1. The second level arbiter 34 selects group 1, i.e., requester 4, since group 1 was the previously selected group and the group 1 wrap signal is not asserted.

In arbitration period 4, the previously selected requester is now 4. Let us assume requesters 9 and 6 are active. Since requester 9 is the only requester in group 2, it is selected. Since requester 6 is the only requester in group 1, it is selected. The group 1 wrap signal is asserted since a wrap condition was generated to select requester 6, i.e., since the group 1 arbiter 36B had to wrap from requester 4 back up to requester 7 and down to 6. The previous group is 1 since the previously selected requester 4 is in group 1. The second level arbiter 34 selects group 2, i.e., requester 9, since the previously selected group is group 1, but group 1 has wrapped, and group 0 does not have any active requesters.

In arbitration period 5, the previously selected requester is now 9. Let us assume requesters 6 and 2 are active. Since requester 6 is the only requester in group 1, it is selected. Since requester 2 is the only requester in group 0, it is selected. The group 2 wrap signal is asserted since a wrap condition was generated in searching for an active requester in group 2 even though none were found. The previously selected group was 2. The second level arbiter 34 selects group 1, i.e., requester 6, since the previously selected group was group 2, but group 2 has no active requesters and group 1 is next in the fixed cyclical order among the groups.

In arbitration period 6, the previously selected requester is now 6. Let us assume requester 2 is active. Since requester 2 is the only requester in group 0, it is selected. The group 1 wrap signal is asserted since a wrap condition occurred looking for an active requester in group 1, but none were found. The previously selected group was 1. The second level arbiter 34 selects group 0, i.e., requester 2, since it is the only group with an active requester.

In arbitration period 7, the previously selected requester is now 2. Let us assume no requesters are active. The group 0 wrap signal is asserted since a wrap condition occurred in searching for an active requester in group 0 although none were found. The previously selected group is 0. The second level arbiter 34 selects no groups and therefore no requesters since none are active, i.e., no requesters are requesting use of the shared resource.

Appendix C includes Verilog source code to describe an implementation of the arbiter 32 of FIG. 2. Signal names in the source code of Appendix C correspond to signal names of FIG. 2.

Appendix D includes a timing report indicating the data arrival time, i.e., the worst case propagation delay for the arbiter 32 described in Appendix C to select one of the 12 requesters, in this case requester 8. The worst case time for at least one implementation using current technology is 9.59 nanoseconds. As may be readily observed, the worst case data arrival time of the arbiter 32 described in Appendix C of the present invention is advantageously less than half the data arrival time of the conventional arbiter 12 described in Appendix A.

A second advantage is realized by the arbiter 32 of the present invention with relation to the conventional arbiter 12, namely, reduced real estate requirements. As indicated in Appendix B, the estimated cell area of the arbiter 12 described in Appendix A is 44905.246094 square microns using a current technology. In contrast, the estimated cell area of the arbiter 32 described in Appendix C is 24423.289062 square microns using the same current technology. As may be readily observed, the estimated cell area of the arbiter 32 described in Appendix C of the present invention is advantageously only a little more than half the cell area of the conventional arbiter 12 described in Appendix A.

Generally speaking, the 2-level cascaded arbitration mechanism architecture of the present invention may be embodied in a variety of manners regarding numbers of groups and numbers of requesters per group. For example, a 12-input (i.e., 12 requester) 2-level cascaded arbiter may be embodied as six 2-input first level arbiters and a second level arbiter which receives 6 groups of selected requests. Furthermore, embodiments comprising four 3-input first level arbiters providing four groups of selected requests to a second level arbiter, or two 6-input first level arbiters providing two groups are contemplated. It is noted however, that generally speaking, the number of groups selected should be an integer multiple of the square root of the number of requesters being arbitrated between in order to realize optimal performance.

It will be appreciated by those skilled in the art having the benefit of this disclosure that the form of the invention shown and described is to be taken as exemplary, presently preferred embodiments. Various modifications and changes may be made without departing from the spirit and scope of the invention as set forth in the claims. It is intended that the following claims be interpreted to embrace all such modifications and changes.

APPENDIX A

```verilog
// Verilog source code for conventional 12-input round robin arbiter module test (current_req,prev_selecteded,selected_req);

input  [11:0] current_req;     // currently active requests
input  [11:0] prev_selected;   // previously selected request output [11:0] selected_req;    // selected request reg [11:0] selected_req;

always @(current_req or prev_selecteded)
  begin
    selected_req = 0;
    case (prev_selected) // synopsys full_case parallel_case
      12'h1, 12'h0:
            if (current_req[11])     selected_req = 12'h800;
            else if (current_req[10]) selected_req = 12'h400;
            else if (current_req[9])  selected_req = 12'h200;
            else if (current_req[8])  selected_req = 12'h100;
            else if (current_req[7])  selected_req = 12'h080;
            else if (current_req[6])  selected_req = 12'h040;
            else if (current_req[5])  selected_req = 12'h020;
            else if (current_req[4])  selected_req = 12'h010;
            else if (current_req[3])  selected_req = 12'h008;
            else if (current_req[2])  selected_req = 12'h004;
            else if (current_req[1])  selected_req = 12'h002;
            else if (current_req[0])  selected_req = 12'h001;

12'h800:
            if (current_req[10])     selected_req = 12'h400;
            else if (current_req[9])  selected_req = 12'h200;
            else if (current_req[8])  selected_req = 12'h100;
            else if (current_req[7])  selected_req = 12'h080;
            else if (current_req[6])  selected_req = 12'h040;
            else if (current_req[5])  selected_req = 12'h020;
            else if (current_req[4])  selected_req = 12'h010;
            else if (current_req[3])  selected_req = 12'h008;
            else if (current_req[2])  selected_req = 12'h004;
            else if (current_req[1])  selected_req = 12'h002;
            else if (current_req[0])  selected_req = 12'h001;
            else if (current_req[11]) selected_req = 12'h800;
```

```
12'h400:
    if (current_req[9])      selected_req = 12'h200;
    else if (current_req[8]) selected_req = 12'h100;
    else if (current_req[7]) selected_req = 12'h080;
    else if (current_req[6]) selected_req = 12'h040;
    else if (current_req[5]) selected_req = 12'h020;
    else if (current_req[4]) selected_req = 12'h010;
    else if (current_req[3]) selected_req = 12'h008;
    else if (current_req[2]) selected_req = 12'h004;
    else if (current_req[1]) selected_req = 12'h002;
    else if (current_req[0]) selected_req = 12'h001;
    else if (current_req[11]) selected_req = 12'h800;
    else if (current_req[10]) selected_req = 12'h400;

12'h200:
    if (current_req[8])      selected_req = 12'h100;
    else if (current_req[7]) selected_req = 12'h080;
    else if (current_req[6]) selected_req = 12'h040;
    else if (current_req[5]) selected_req = 12'h020;
    else if (current_req[4]) selected_req = 12'h010;
    else if (current_req[3]) selected_req = 12'h008;
    else if (current_req[2]) selected_req = 12'h004;
    else if (current_req[1]) selected_req = 12'h002;
    else if (current_req[0]) selected_req = 12'h001;
    else if (current_req[11]) selected_req = 12'h800;
    else if (current_req[10]) selected_req = 12'h400;
    else if (current_req[9]) selected_req = 12'h200;

12'h100:
    if (current_req[7])      selected_req = 12'h080;
    else if (current_req[6]) selected_req = 12'h040;
    else if (current_req[5]) selected_req = 12'h020;
    else if (current_req[4]) selected_req = 12'h010;
    else if (current_req[3]) selected_req = 12'h008;
    else if (current_req[2]) selected_req = 12'h004;
    else if (current_req[1]) selected_req = 12'h002;
    else if (current_req[0]) selected_req = 12'h001;
    else if (current_req[11]) selected_req = 12'h800;
    else if (current_req[10]) selected_req = 12'h400;
    else if (current_req[9]) selected_req = 12'h200;
    else if (current_req[8]) selected_req = 12'h100;

12'h080:
    if (current_req[6])      selected_req = 12'h040;
```

```
        else if (current_req[5]) selected_req = 12'h020;
        else if (current_req[4]) selected_req = 12'h010;
        else if (current_req[3]) selected_req = 12'h008;
        else if (current_req[2]) selected_req = 12'h004;
        else if (current_req[1]) selected_req = 12'h002;
        else if (current_req[0]) selected_req = 12'h001;
        else if (current_req[11]) selected_req = 12'h800;
        else if (current_req[10]) selected_req = 12'h400;
        else if (current_req[9]) selected_req = 12'h200;
        else if (current_req[8]) selected_req = 12'h100;
        else if (current_req[7]) selected_req = 12'h080;

12'h040:
        if (current_req[5])      selected_req = 12'h020;
        else if (current_req[4]) selected_req = 12'h010;
        else if (current_req[3]) selected_req = 12'h008;
        else if (current_req[2]) selected_req = 12'h004;
        else if (current_req[1]) selected_req = 12'h002;
        else if (current_req[0]) selected_req = 12'h001;
        else if (current_req[11]) selected_req = 12'h800;
        else if (current_req[10]) selected_req = 12'h400;
        else if (current_req[9]) selected_req = 12'h200;
        else if (current_req[8]) selected_req = 12'h100;
        else if (current_req[7]) selected_req = 12'h080;
        else if (current_req[6]) selected_req = 12'h040;

12'h020:
        if (current_req[4])      selected_req = 12'h010;
        else if (current_req[3]) selected_req = 12'h008;
        else if (current_req[2]) selected_req = 12'h004;
        else if (current_req[1]) selected_req = 12'h002;
        else if (current_req[0]) selected_req = 12'h001;
        else if (current_req[11]) selected_req = 12'h800;
        else if (current_req[10]) selected_req = 12'h400;
        else if (current_req[9]) selected_req = 12'h200;
        else if (current_req[8]) selected_req = 12'h100;
        else if (current_req[7]) selected_req = 12'h080;
        else if (current_req[6]) selected_req = 12'h040;
        else if (current_req[5]) selected_req = 12'h020;

12'h020:
        if (current_req[4])      selected_req = 12'h010;
        else if (current_req[3]) selected_req = 12'h008;
        else if (current_req[2]) selected_req = 12'h004;
        else if (current_req[1]) selected_req = 12'h002;
```

```
            else if (current_req[0])  selected_req = 12'h001;
            else if (current_req[11]) selected_req = 12'h800;
            else if (current_req[10]) selected_req = 12'h400;
            else if (current_req[9])  selected_req = 12'h200;
            else if (current_req[8])  selected_req = 12'h100;
            else if (current_req[7])  selected_req = 12'h080;
            else if (current_req[6])  selected_req = 12'h040;
            else if (current_req[5])  selected_req = 12'h020;

12'h010:
            if (current_req[3])       selected_req = 12'h008;
            else if (current_req[2])  selected_req = 12'h004;
            else if (current_req[1])  selected_req = 12'h002;
            else if (current_req[0])  selected_req = 12'h001;
            else if (current_req[11]) selected_req = 12'h800;
            else if (current_req[10]) selected_req = 12'h400;
            else if (current_req[9])  selected_req = 12'h200;
            else if (current_req[8])  selected_req = 12'h100;
            else if (current_req[7])  selected_req = 12'h080;
            else if (current_req[6])  selected_req = 12'h040;
            else if (current_req[5])  selected_req = 12'h020;
            else if (current_req[4])  selected_req = 12'h010;

12'h008:
            if (current_req[2])       selected_req = 12'h004;
            else if (current_req[1])  selected_req = 12'h002;
            else if (current_req[0])  selected_req = 12'h001;
            else if (current_req[11]) selected_req = 12'h800;
            else if (current_req[10]) selected_req = 12'h400;
            else if (current_req[9])  selected_req = 12'h200;
            else if (current_req[8])  selected_req = 12'h100;
            else if (current_req[7])  selected_req = 12'h080;
            else if (current_req[6])  selected_req = 12'h040;
            else if (current_req[5])  selected_req = 12'h020;
            else if (current_req[4])  selected_req = 12'h010;
            else if (current_req[3])  selected_req = 12'h008;

12'h004:
            if (current_req[1])       selected_req = 12'h002;
            else if (current_req[0])  selected_req = 12'h001;
            else if (current_req[11]) selected_req = 12'h800;
            else if (current_req[10]) selected_req = 12'h400;
            else if (current_req[9])  selected_req = 12'h200;
            else if (current_req[8])  selected_req = 12'h100;
            else if (current_req[7])  selected_req = 12'h080;
```

```
            else if (current_req[6])  selected_req = 12'h040;
            else if (current_req[5])  selected_req = 12'h020;
            else if (current_req[4])  selected_req = 12'h010;
            else if (current_req[3])  selected_req = 12'h008;
            else if (current_req[2])  selected_req = 12'h004;

12'h002:
            if (current_req[0])       selected_req = 12'h001;
            else if (current_req[11]) selected_req = 12'h800;
            else if (current_req[10]) selected_req = 12'h400;
            else if (current_req[9])  selected_req = 12'h200;
            else if (current_req[8])  selected_req = 12'h100;
            else if (current_req[7])  selected_req = 12'h080;
            else if (current_req[6])  selected_req = 12'h040;
            else if (current_req[5])  selected_req = 12'h020;
            else if (current_req[4])  selected_req = 12'h010;
            else if (current_req[3])  selected_req = 12'h008;
            else if (current_req[2])  selected_req = 12'h004;
            else if (current_req[1])  selected_req = 12'h002;
    endcase
  end endmodule
```

APPENDIX B

```
*****************************************
Report : timing
    -path full
    -delay max
    -max_paths 1
Design : test
Version: v3.4b
*****************************************

Operating Conditions:
Wire Loading Model Mode: segmented
```

| Design | Wire Loading Model | Library |
|---|---|---|
| test | CONSERVATIVE | cs24s34_comlib |

Startpoint: prev_selected[2]
    (input port)
Endpoint: selected_req[4] (output port)
Path Group: (none)
Path Type: max

| Point | Incr | Path |
|---|---|---|
| input external delay | 0.00 | 0.00 r |
| prev_selected[2] (in) | 0.00 | 0.00 r |
| U696/O (nr2s_a) | 0.61 | 0.61 f |
| U871/O (ins_a) | 0.56 | 1.17 r |
| U697/O (nr2s_a) | 0.74 | 1.91 f |
| U699/O (nd2s_a) | 1.09 | 3.00 r |
| U873/O (ins_a) | 0.72 | 3.71 f |
| U714/O (nd3s_a) | 1.08 | 4.79 r |
| U882/O (ins_a) | 0.83 | 5.62 f |
| U705/O (nr2s_a) | 0.50 | 6.12 r |
| U876/O (ins_a) | 1.56 | 7.68 f |
| U795/O (nr2_2s_a) | 1.01 | 8.69 r |
| U796/O (nd2_2s_a) | 1.19 | 9.88 f |
| U912/O (ins_a) | 0.79 | 10.67 r |
| U798/O (nd3_2_2s_a) | 2.52 | 13.18 f |
| U711/O (nd2s_a) | 1.99 | 15.17 r |
| U748/O (nd2s_a) | 0.96 | 16.14 f |

| | | |
|---|---|---|
| U905/O (ins_a) | 0.60 | 16.74 r |
| U817/O (nd3_2s_a) | 0.67 | 17.41 f |
| U819/O (nd2s_a) | 0.63 | 18.04 r |
| U820/O (nd2_23s_a) | 0.41 | 18.45 f |
| U845/O (nd2_222s_a) | 0.75 | 19.20 r |
| U669/O (nr2_33s_a) | 0.56 | 19.76 f |
| selected_req[4] (out) | 0.00 | 19.76 f |
| data arrival time | | 19.76 |

---

(Path is unconstrained)

\*\*\*\*\*\*\*\*\*\*\*\*\*\*\*\*\*\*\*\*\*\*\*\*\*\*\*\*\*\*\*\*\*\*\*\*\*\*\*\*
Report : area
Design : test
Version: v3.4b
\*\*\*\*\*\*\*\*\*\*\*\*\*\*\*\*\*\*\*\*\*\*\*\*\*\*\*\*\*\*\*\*\*\*\*\*\*\*\*\*

Library(s) Used:

cs24s34_comlib (File: /proj/Local/libs/syn/cs34l_wc_lin.v3.4b.db)

| | |
|---|---|
| Number of ports: | 36 |
| Number of nets: | 276 |
| Number of cells: | 253 |
| Number of references: | 40 |

Combinational area:   44905.246094
Noncombinational area:   0.000000
Net Interconnect area:   undefined (Wire load has zero net area)

Total cell area:   44905.246094
Total area:   undefined

APPENDIX C

// Verilog source code for 2-level cascaded 12-input round robin arbiter

```verilog
module rr4 (current_req, prev_selected, selected_group, wrap);

input [3:0] current_req;      // current requests
input [3:0] prev_selected;    // previously selected request output [3:0] select_group;    // selected group
output      wrap;             // next round reg [4:0] sel;

always @(current_req or prev_selected)
begin
  sel = 0;
  casex (prev_selected) // synopsys full_case parallel_case
      4'b000x: if (current_req[3])      sel = 5'b10000;
               else if (current_req[2]) sel = 5'b01000;
               else if (current_req[1]) sel = 5'b00100;
               else if (current_req[0]) sel = 5'b00010;

4'b1000: if (current_req[2])      sel = 5'b01000;
               else if (current_req[1]) sel = 5'b00100;
               else if (current_req[0]) sel = 5'b00010;
               else if (current_req[3]) sel = 5'b10001;

4'b0100: if (current_req[1])      sel = 5'b00100;
               else if (current_req[0]) sel = 5'b00010;
               else if (current_req[3]) sel = 5'b10001;
               else if (current_req[2]) sel = 5'b01001;

4'b0010: if (current_req[0])      sel = 5'b00010;
               else if (current_req[3]) sel = 5'b10001;
               else if (current_req[2]) sel = 5'b01001;
               else if (current_req[1]) sel = 5'b00101;
  endcase
end assign selected_group = sel[4:1];
assign wrap           = sel[0] | prev_selected[0];

endmodule
```

```verilog
module rr12 (current_req, prev_selected, selected_req);

input [11:0] current_req;      // current requests
input [11:0] prev_selected;    // previously selected request output [11:0] selected_req;    // selected request wire [3:0] group0, group1, group2;
reg [2:0] sel;

rr4 rr4_0 (.current_req(current_req[11:8]), .prev_selected(prev_selected[11:8]),
 .select_req(group0),
       .wrap(wrap0));
rr4 rr4_1 (.current_req(current_req[7:4]), .prev_selected(prev_selected[7:4]),
 .select_req(group1),
       .wrap(wrap1));
rr4 rr4_2 (.current_req(current_req[3:0]), .prev_selected(prev_selected[3:0]),
 .select_req(group2),
       .wrap(wrap2));

wire req_g0 = |current_req[11:8];
  wire req_g1 = |current_req[7:4];
  wire req_g2 = |current_req[3:0];
  wire prev_group0 = |prev_selected[11:8];
  wire prev_group1 = |prev_selected[7:4];
  wire prev_group2 = |prev_selected[3:0];

always @(prev_group0 or prev_group1 or prev_group2 or wrap0 or wrap1 or wrap2 or
       req_g0 or req_g1 or req_g2)
  begin
    sel = 3'b000;
    case ({prev_group0,prev_group1,prev_group2}) // synopsys full_case parallel_case
      3'b000: if (req_g0)     sel = 3'b001;
           else if (req_g1) sel = 3'b010;
           else if (req_g2) sel = 3'b100;

3'b100: if (req_g0 & ~wrap0)    sel = 3'b001;
           else if (req_g1)       sel = 3'b010;
           else if (req_g2)       sel = 3'b100;
           else if (req_g0 & wrap0) sel = 3'b001;

3'b010: if (req_g1 & ~wrap1)    sel = 3'b010;
           else if (req_g2)       sel = 3'b100;
           else if (req_g0)       sel = 3'b001;
```

```
            else if (req_g1 & wrap1) sel = 3'b010;

3'b001: if (req_g2 & ~wrap2)    sel = 3'b100;
             else if (req_g0)        sel = 3'b001;
             else if (req_g1)        sel = 3'b010;
             else if (req_g2 & wrap2) sel = 3'b100;
    endcase
  end assign selected_req[11:8] = (sel[0]) ? group0 : 4'b0000;
  assign selected_req[7:4]  = (sel[1]) ? group1 : 4'b0000;
  assign selected_req[3:0]  = (sel[2]) ? group2 : 4'b0000;

endmodule
```

APPENDIX D

```
*****************************************
Report : timing
      -path full
      -delay max
      -max_paths 1
Design : rr12
Version: v3.4b
*****************************************
```

Operating Conditions:
Wire Loading Model Mode: segmented

| Design | Wire Loading Model | Library |
|--------|--------------------|---------| 
| rr12   | CONSERVATIVE       | cs24s34_comlib |
| rr4_2  | CONSERVATIVE       | cs24s34_comlib |
| rr4_1  | CONSERVATIVE       | cs24s34_comlib |
| rr4_0  | CONSERVATIVE       | cs24s34_comlib |

Startpoint: prev_selected[5]
    (input port)
Endpoint: selected_req[8] (output port)
Path Group: (none)
Path Type: max

| Point | Incr | Path |
|-------|------|------|
| input external delay | 0.00 | 0.00 r |
| prev_selected[5] (in) | 0.00 | 0.00 r |
| rr4_1/prev_selected[1] (rr4_0) | 0.00 | 0.00 r |
| rr4_1/U104/O (nr2s_a) | 0.64 | 0.64 f |
| rr4_1/U114/O (mx2s_a) | 0.68 | 1.32 f |
| rr4_1/U111/O (nd4s_a) | 0.95 | 2.27 r |
| rr4_1/U123/O (ins_a) | 0.62 | 2.89 f |
| rr4_1/U108/O (nr2s_a) | 0.25 | 3.14 r |
| rr4_1/U96/O (nd3_2s_a) | 1.00 | 4.14 f |
| rr4_1/wrap (rr4_0) | 0.00 | 4.14 f |
| U136/O (nr2s_a) | 0.71 | 4.85 r |
| U157/O (ins_a) | 0.56 | 5.41 f |
| U140/O (nd2_222s_a) | 0.72 | 6.13 r |
| U141/O (nd2s_a) | 0.47 | 6.60 f |

| | | |
|---|---|---|
| U142/O (nd2_222s_a) | 0.69 | 7.29 r |
| U143/O (nd2_2s_a) | 1.47 | 8.76 f |
| U117/O (an2s_a) | 0.83 | 9.59 f |
| selected_req[8] (out) | 0.00 | 9.59 f |
| data arrival time | | 9.59 |

------------------------------------------------

(Path is unconstrained)

****************************************
Report : area
Design : rr12
Version: v3.4b
****************************************

Library(s) Used:

cs24s34_comlib (File: /proj/Local/libs/syn/cs34l_wc_lin.v3.4b.db)

Number of ports:         36
Number of nets:          86
Number of cells:         50
Number of references:    15

Combinational area:    24423.289062
Noncombinational area:     0.000000
Net Interconnect area:    undefined  (Wire load has zero net area)

Total cell area:    24423.289062
Total area:         undefined

What is claimed is:

1. An arbitration mechanism for selecting one of a plurality of request signals, comprising:

a series of first level arbiters configured in parallel, wherein each said first level arbiter is configured to receive a group of said request signals and to select a request signal from among the group of said plurality of request signals it receives and forward that request signal to a second level arbiter; and said second level arbiter configured to receive and discern which said request signal forwarded from the first level arbiters to select, wherein the second level arbiter is further configured to select a current request signal forwarded from the same first level arbiter which selected a previous request signal sent prior to the current request signal before selecting a request signal forwarded from a first level arbiter different from the first level arbiter which forwarded the previous selected request signal.

2. The arbitration mechanism as recited in claim 1, further comprising logic coupled to store an indication of said previous selected request signal.

3. The arbitration mechanism as recited in claim 2, wherein said second level arbiter performs selection in response to said indication of the previous selected request signal forwarded thereto.

4. The arbitration mechanism as recited in claim 1, wherein each of said first level arbiters is connected to select said request signal from among said group according to a pre-defined numerically increasing or decreasing order.

5. The arbitration mechanism as recited in claim 4, wherein each of said first level arbiters is connected to provide to said second level arbiter a wrap signal indicating if the current request signal is out of numerical order from that of the previous selected request signal.

6. The arbitration mechanism as recited in claim 5, wherein said wrap signal indicates said first level arbiter has wrapped around said pre-defined numerically increasing or decreasing order.

7. The arbitration mechanism as recited in claim 5, wherein said second level arbiter is connected to select said current request signal forwarded from said same first level arbiter which forwarded said previous selected request signal at times during which said same first level arbiter negates said wrap signal.

8. The arbitration mechanism as recited in claim 5, wherein said second level arbiter is connected to select a request signal forwarded from a first level arbiter different from the first level arbiter which forwarded said previous selected request signal if said wrap signal is present.

9. The arbitration mechanism as recited in claim 8, wherein said second level arbiter is connected to select said first level arbiter in a fixed cyclical order.

10. The arbitration mechanism as recited in claim 1, wherein the number of said series of first level arbiters is selected from among the set consisting of the square root of the number of said plurality of request signals, one more than the square root of the number of said plurality of request signals, and one less than the square root of the number of said plurality of request signals.

11. A method for selecting one of a plurality of requests, comprising:

grouping said plurality of requests into groups of requests;

selecting in parallel an intermediate request from each of said groups of requests; and selecting, from among the intermediate requests, a current request from the same one of said groups of requests from which a request previous to the current request was selected before selecting from a different one of said groups of requests.

12. The method as recited in claim 11, further comprising storing an indication of said previous selected request.

13. The method as recited in claim 12, wherein said selecting a current request is in response to said indication of said previous selected request.

14. The method as recited in claim 13, wherein said selecting an intermediate request from each of said groups of requests is performed according to a pre-defined numerically increasing or decreasing order in response to said indication of said previous selected request.

15. The method as recited in claim 14, further comprising determining if a wrap condition has occurred wherein the current request signal is out of numerical order from that of the previous selected request signal.

16. The method as recited in claim 15, wherein said current request is selected from the same one of said groups of requests from which the previous request was selected unless said wrap condition has occurred in said same one of said groups of requests.

17. The method as recited in claim 16, wherein said request is selected from a next one of said groups of requests different from the one of said groups of requests from which the previous request was selected if said wrap condition has occurred in said same one of said groups of requests.

18. The method as recited in claim 17, wherein said next one of said groups of requests is selected according to a pre-defined numerically increasing or decreasing order.

19. An arbitration mechanism, comprising a plurality of first level arbiters each configured to receive a group of request signals, wherein during a current arbitration period if any of the request signals it receives is active, each first level arbiter is configured to select only one of the active request signals and indicate to a second level arbiter which active signal has been selected; and wherein said second level arbiter is configured to select one of the active request signals indicated by said first level arbiters, wherein if more than one of the first level arbiters indicates an active request signal and one of the first level arbiters indicating an active request signal also indicated an active request signal in an immediately previous arbitration period, said second level arbiter will select the active request signal from that first level arbiter unless said second level arbiter receives an indication from that first level arbiter that it should receive lower priority.

20. The arbitration mechanism as recited in claim 19, wherein said first level arbiters select an active request signal according to a defined order, and wherein each first level arbiter provides said indication that it should receive lower priority when it must repeat said order to select an active request signal.

* * * * *